US006463495B1

(12) United States Patent
Angelo et al.

(10) Patent No.: US 6,463,495 B1
(45) Date of Patent: Oct. 8, 2002

(54) COMMAND AND CONTROL INFRASTRUCTURE FOR A COMPUTER SYSTEM USING THE COMPUTER'S POWER RAIL

(75) Inventors: Michael F. Angelo, Houston; Sompong P. Olarig, Cypress; Chi Kim Sides; Kenneth A. Jansen, both of Spring, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/280,311

(22) Filed: Mar. 29, 1999

(51) Int. Cl.$^7$ .......................... G06F 13/38; G06F 13/40
(52) U.S. Cl. ..................... 710/305; 710/100; 710/107; 713/300; 340/310
(58) Field of Search .................. 710/100, 101, 710/305–317; 713/300–340; 340/310

(56) References Cited

U.S. PATENT DOCUMENTS

| 4,792,731 A | 12/1988 | Pearlman et al. |
| 5,059,871 A | 10/1991 | Pearlman et al. |
| 5,144,666 A | 9/1992 | Le Van Suu |
| 5,268,666 A | * 12/1993 | Michel et al. ......... 340/310.06 |
| 5,352,957 A | 10/1994 | Werner |
| 5,382,951 A | 1/1995 | White et al. |
| 5,400,330 A | 3/1995 | Le Van Suu |
| 5,406,248 A | 4/1995 | Le Van Suu |
| 5,410,292 A | 4/1995 | Le Van Suu |
| 5,453,738 A | 9/1995 | Zirkl et al. |
| 5,805,926 A | 9/1998 | Le Van Suu |
| 6,005,476 A | * 12/1999 | Valiulis ............... 340/310.01 |

FOREIGN PATENT DOCUMENTS

| EP | 361993 B2 | 8/1993 |
| EP | 466152 B1 | 11/1994 |
| EP | 574636 B1 | 8/1996 |

* cited by examiner

Primary Examiner—Rupal Dharia
(74) Attorney, Agent, or Firm—Conley, Rose & Tayon, P.C.

(57) ABSTRACT

A method and system of intrachassis computer component command and control. The existing power rail is used as network connectivity. Further, the CEBus standard (or a CEBus standard modified for the particular power bus) is used to provide platform management functionality. This management functionality is similar to that provided by the proposed IPMI specification. However, the management functionality is implemented intrachassis, that is, it is applied to the internal components of the machine. Particularly advantageous functions, such as rollcall enumeration and command authentication and verification, are included in a preferred embodiment. Further, because these innovative techniques utilize the existing power rail, no additional external cables are required.

18 Claims, 3 Drawing Sheets

COMMAND AND CONTROL INFRASTRUCTURE FOR A COMPUTER SYSTEM USING THE COMPUTER'S POWER RAIL

BACKGROUND AND SUMMARY OF THE INVENTION

The present invention relates to secondary bus communications between components in a computer chassis.

1. Background: Home Automation Standards

Home automation systems have long used special techniques for local communication over power mains. This was originally necessitated by the absence of any other type of bus over which "smart" devices could "talk" to each other. However, communication over power mains also introduces very specific problems, including those of line noise received from motors and other devices attached to the power mains, the need to ensure that the data itself does not interfere with other devices connected to the mains, and limited bandwidth. For similar reasons, low-bandwidth power-mains communications have also been used for limited data communications between smart devices and local electric utility control systems.

One example of an industry standard for building or home automation data communication systems has been the X10 or X-10 communications protocol for remote control of electrical devices which communicate across standard wiring or power lines of a building such as a home. (In general, methods of ensuring the accuracy of transmitted and received data are known as communications protocols.) The X10 communications protocol allows various home electronic devices, such as lighting controllers or switches, status indicators, security systems, telephone interfaces, computer interfaces, and various home appliances, to readily be linked together for simple control applications. The X10 communications protocol generally has a narrow bandwidth, i.e., 120 KiloHertz ("KHz"), for communicating data at a relatively slow speed, i.e., 60 bits/second.

Another industry standard for home automation has been the Consumer Electronic Bus ("CEBus") standard, which describes a local communications and control network designed specifically for the home. Like X10, the CEBus standard provides a standardized communication facility for exchange of control information and data among various devices and services in the home, such as lighting controllers or switches, status indicators, security systems, telephone interfaces, computer interfaces, stereo systems, and home appliances. The CEBus standard was developed by the Consumer Electronics Group of the Electronic Industries Association ("EIA") and an inter-industry committee of representatives from both EIA and non-member companies. The CEBus standard generally has a wide bandwidth, e.g. 100–400 KHz, for communicating data at a relatively fast speed, i.e., 10 Kilobits/second and is significantly faster and more reliable than the X10 communications protocol. The CEBus standard also allows full networking of consumer application devices. The CEBus standard encompasses both the physical media (wires, fiber, etc.) and the protocol (software) used to create an intelligent home or office.

The newest standard for home automation is the EIA-600 standard, which is intended to handle existing and anticipated control communication requirements at minimum practical costs consistent with a broad spectrum of residential applications. It is intended for such functions as remote control, status indication, remote instrumentation, energy management, security systems, entertainment device coordination, etc. These situations require economical connection to a shared local communication network carrying relatively short digital messages.

2. Background: Platform Management

Presently, there are different types of data transmission systems which allow computer network components to be automatically controlled and monitored at a distance. These known systems are generally connected by a dedicated network, and consist of individual control and monitoring modules at each node, which are in turn managed by a central system.

The Intelligent Platform Management Interface (or "IPMI") specification was announced by Intel, Dell, Hewlett-Packard Company, and NEC to provide a standard interface to hardware used for monitoring a server's physical characteristics, such as temperature, voltage, fans, power supplies and chassis.

The IPMI specification defines a common interface and message-based protocol for accessing platform management hardware. IPMI is comprised of three specifications: Intelligent Platform Management Interface, Intelligent Platform Management Bus (IPMB) and Intelligent Chassis Management Bus (ICMB). The IPMI specification defines the interface to platform management hardware, the IPMB specification defines the internal Intelligent Platform Management Bus, and the ICMB specification defines the external Intelligent Chassis Management Bus, an external bus for connecting additional IPMI-enabled systems.

IPMI provides access to platform management information. IPMI-enabled servers monitor and store platform management information in a common format which can be easily accessed by server management software, add-in devices or even directly from other servers.

A management bus, IPMB, allows add-in devices such as Emergency Management Cards to access platform management information, even if the processor is down. The IPMB can also be extended externally to the chassis (ICMB) to enable "system-to-system" monitoring. This allows a server to manage another ICMB-connected server even if it has no system management software or the processor is down.

Functions such as failure alerting, power control and access to failure logs are supported for systems connected to the ICMB, so multiple servers or peripheral chassis (storage and power supplies) can connect to the ICMB as an alternative to using Emergency Management Cards.

IPMI allows differentiated hardware solutions to be implemented quickly and easily. The IPMI interface isolates server management software from hardware, enabling hardware changes to be made without impacting the software. Although IPMI is not tied to a specific operating system or management application, it is complementary to higher level management software interfaces such as the Simple Network Management Protocol (SNMP), Desktop Management Interface (DMI), Common Information Model (CIM), and Windows Management Interface (WMI), which facilitate the development of cross platform solutions.

IPMI allows system managers to determine the health of their server hardware, whether the server is running normally or is in a nonoperational state. Servers based on IPMI use "intelligent" or autonomous hardware that remains operational even when the processor is down so that platform management information is always accessible. The IPMI interfaces enable platform management hardware to be accessed not only by management software but also accessed by third party emergency management add-in cards and even other IPMI-enabled servers. System-to-system monitoring or management via a connected server is becoming increasingly important as system managers deploy complex system topologies such as clusters and rack-mounted configurations. In addition, the scalable nature of IPMI enables the architecture to be deployed across a server product line, from entry to high-end servers, and gives system managers a consistent base of platform management functionality upon which to effectively manage their servers. One specific disadvantage of this approach is that additional physical connections and device support is required to interconnect these components.

A Command and Control Infrastructure for a Computer System

The present application discloses a method and system of intrachassis computer component command and control wherein the existing power rail is used as a "network" connection for internal system components. Particularly advantageous functions, such as rollcall enumeration and command authentication and verification, are included in a preferred embodiment. Further, because these innovative techniques utilize the existing power rail, no additional external cables are required.

According to a preferred embodiment, the CEBus standard (or a CEBus standard modified for the requirements of the particular power rail) is used to provide platform management functionality. This management functionality is similar to that provided by the proposed IPMI specification.

BRIEF DESCRIPTION OF THE DRAWINGS

The disclosed inventions will be described with reference to the accompanying drawings, which show some embodiments of the invention and which are incorporated in the specification hereof by reference, wherein.

DETAILED DESCRIPTION OF PREFERRED EMBODIMENTS

Figure 1:
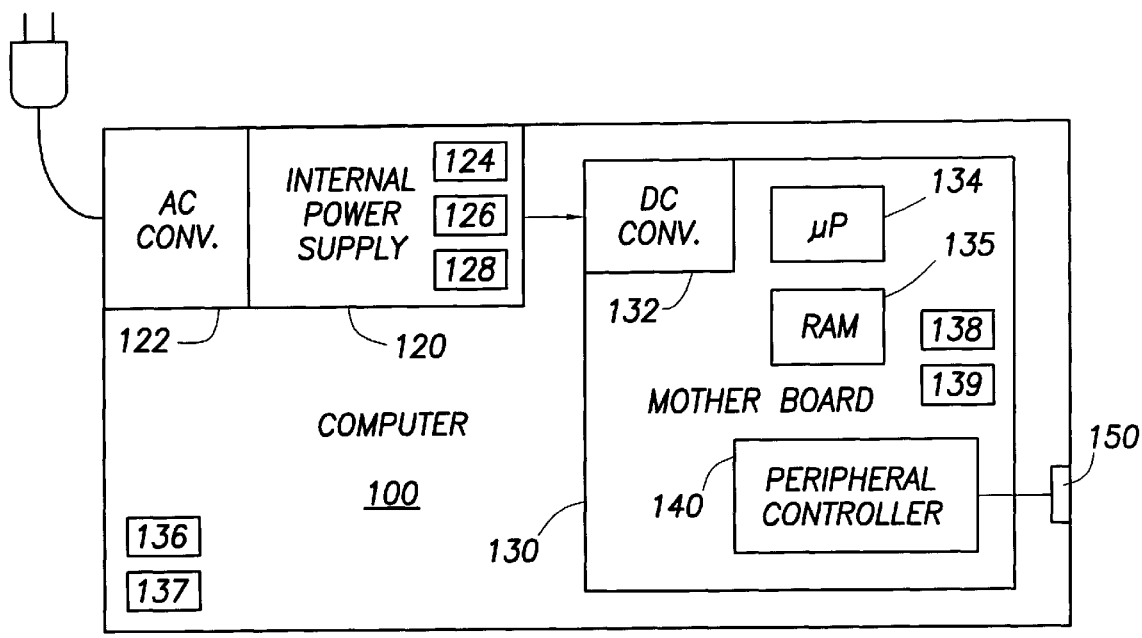
FIG. 1 shows an electrical configuration of some parts of a computer according to a preferred embodiment.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

This application shares some text and figures with the following commonly owned applications, filed concurrently with the present application, and hereby incorporated by reference: application Ser. No. 09/290,313, filed on Mar. 29, 1999, application Ser. No. 09/280,314, filed on Mar. 29, 1999, and application Ser. No. 09/293,587, filed on Apr. 16, 1999.

Definitions

Following are short definitions of the usual meanings of some of the technical terms which are used in the present application. (However, those of ordinary skill will recognize whether the context requires a different meaning.) Additional definitions can be found in the standard technical dictionaries and journals.

X-10 is the oldest and most widely-used home automation protocol. It uses the power lines as a transmission medium. LonWorks Echelon Corporation developed this standard for both home and industrial use, and the standard may be obtained from that company. LonWorks uses a variety of transmission media including IR, RF, coaxial cable, and twisted pair.

IEEE 1394 is a communications standard which supports real-time audio and video transmission with data rates up to 400 Megabits/sec. IEEE 1394 uses a cable consisting of three twisted pairs to connect devices in a network. The IEEE 1394 standard, which is hereby incorporated by reference, is published by, and available from, the IEEE.

CEBus is a newer standard in home automation. Like LonWorks, CEBus uses a variety of transmission media including IR, RF, coaxial cable, and twisted pair. The CEBus standard, which is hereby incorporated by reference, is published by, and available from, the Electronic Industries Association.

USB (or the Universal Serial Bus) was originally intended for use as a home automation protocol. However, it was actually developed as a protocol for computer peripherals by several manufacturers of personal computer products. The USB specification is available, as of the filing date of this application, from the USB Implementer's Forum at http://www.usb.org, and is hereby incorporated by reference.

Power rail refers to any one of the connections which provide power to each of the internal system components of a computer system. The power rail generally receives power from the system power supply, which itself is powered by a battery or an external power source.

Power mains refers to the power mains systems in common use in all industrialized countries. In the United States, for example, this would refer to the common indoor power outlets which supply current at 60 Hz and (for most circuits) about 120V; in the U.K. this would refer to the common indoor power outlets which supply current at 50 Hz and 240V.

Intrachassis refers to components of a computer system connected to a common power rail and, typically, located within a common system unit. In the context of this application, "intrachassis" includes system devices that may be physically located outside the system unit bus, but which are still powered by the common power rail, e.g., an external hard drive.

Overview of Sample Embodiment

According to a preferred embodiment, a computer system is provided in which various "smart" devices within the system are capable of communicating with each other over the system power rail.

FIG. 1 shows a sample electrical configuration of some important parts of a computer 100. The case 110 encloses the motherboard 130 and power supply 120 as well as other components, such as a hard disk drive 136 and a removable media drive 137, and may enclose many other possible components, not shown, such as an I/O channel interfaces, and option cards. The motherboard 130 includes many key components of the computer. For example, the motherboard carries one or more microprocessors (or other processing units) 134, RAM 135, and a peripheral controller 140, as well as many other components which are not shown. Also mounted on the mother board may be a temperature sensor 138 or exhaust fan 139.

The power supply 120 preferably includes an AC convertor 122, which permits power to be drawn from an AC power line, and provides power to a DC connector 132 on the motherboard. Further, the power supply preferably includes a cooling device 124 and a temperature sensor 126.

According to a preferred embodiment, the power supply incorporates a microcontroller 128, which is connected to the system power rail, and is capable of communicating with other devices over the power rail. Other devices will also incorporate a similar microcontroller, not shown, for communicating with the power supply and other components over the power rail. According to a preferred embodiment, this communication is done according to the CEBus standard, described above. Because the particular requirements of the system component may differ, the CEBus standard may be modified, e.g., by voltage scaling, to allow the disclosed communications to occur without interfering with system function.

The exemplary functions below will be described with particular reference to the microcontroller 128 of the power supply, but it will be understood by those skilled in the art that the similar controllers in other system devices will function and communicate similarly. Moreover, when reference is made to any specific component communicating with another over the power rail, it will be understood that this is accomplished by use of the respective microcontrollers of those components.

In this embodiment, various system devices, including the temperature sensor 138, the exhaust fan 119, and the hard disk drive 136, are connected to send and receive signals over the power rail. In this manner, the controller 128 in the lower supply can communicate with these system devices. Further, the system peripheral controller can be connected to communicate over the power rail.

Particular communications supported by the controller 128 include the ability to request basic status information from each device, and to command the devices to power on or off as needed. For example, the controller 128 may receive information from temperature sensor 138 indicating a high temperature, and may command exhaust fan 139 to turn on in response. An exemplary command/data format is described below Further, each system device has an associated identifier address which uniquely identifies that devise within the system. The identifier functions to specifically identify both the type of device and the specific address of that device within devices of that type. This identifier is used to specifically identify the sender and recipient of any data or command sent over the system power rail.

This identifier is particularly advantageous when used to determine which device types are authorized to perform certain functions or to send certain commands. For example, while it may be useful for a temperature sensor, upon detection of an overheating condition, to order the power supply to shut the system down or to place the system in a low-power mode to reduce heat, there is almost no reason for a hard disk drive to request a system shut-down. By identifying the class of device from which a command is sent, the receiver can determine whether or not to respond.

Another particularly useful function of a preferred embodiment is the ability to perform a "roll call" enumeration of the devices present on the system bus. This function is performed by the controller 128 sending out a command requesting that all devices identify themselves. In response, each device responds with an acknowledge signal which includes its identifier. This process allows the controller 128 to keep an inventory of active devices, and therefore which devices it is able to control. Once a roll call has been taken, the controller is able to identify malfunctioning devices by noting which devices fail to respond to this query. If a device fails to respond, it has either failed or lost its connection to the power rail. In either case, it is unavailable for system use.

Also according to a preferred embodiment, each command sent by the controller 128 to a specific de vice causes that device to send an acknowledgment (ACK) over the power rail. If the controller does not receive the ACK, it will periodically resend the command until an ACK is received, and each repeated command will include additional information identifying the number of times this command has been resent.

The device to which the commands are addressed will, as stated and in this embodiment, send an ACK when the command is received, then execute the command. Of course, due to noise on the power rail or other possible problems, there is the chance that this ACK will not be received by the controller 128. If this occurs, controller 128 will resend the command, along with the repetition number of the repeated command. When the device receives it, it will note, by reading the repetition number, that this is a repeated command. If it has already executed the command which is being repeated, then it does not re-execute the command, but does resend an ACK to the controller to indicate that the command was received.

A preferred embodiment provides, system in which devices are plugged into a system's power rail. The power rail can then become a local communications channel, e.g. using a power network technology such as or similar to industry standards CEBus, X-10, and others. When plugged into the power rail, the devices are given identities which are then used to validate authorization for commands. The command authorization and authentication could be validated based on the device's class ID.

A preferred embodiment provides a method and apparatus for a command and control system to enumerate and authenticate local devices based on their ability to answer commands as provided through the local power rail.

A device which is to be managed would have some additional logic, within the ability of one of ordinary skill in the art, and be plugged into the computer's power rail. This device could then be authenticated based on its locality and a device ID class, to the computer's internal power rail.

In addition, a device could provide return status information to a requester, e.g. a temperature sensor might return the temperature or a fan might return its current speed. This information may then be used to modify the system operation, e.g. if the temperature has dropped sufficiently, the fan might then be told to slow down.

Figure 2:
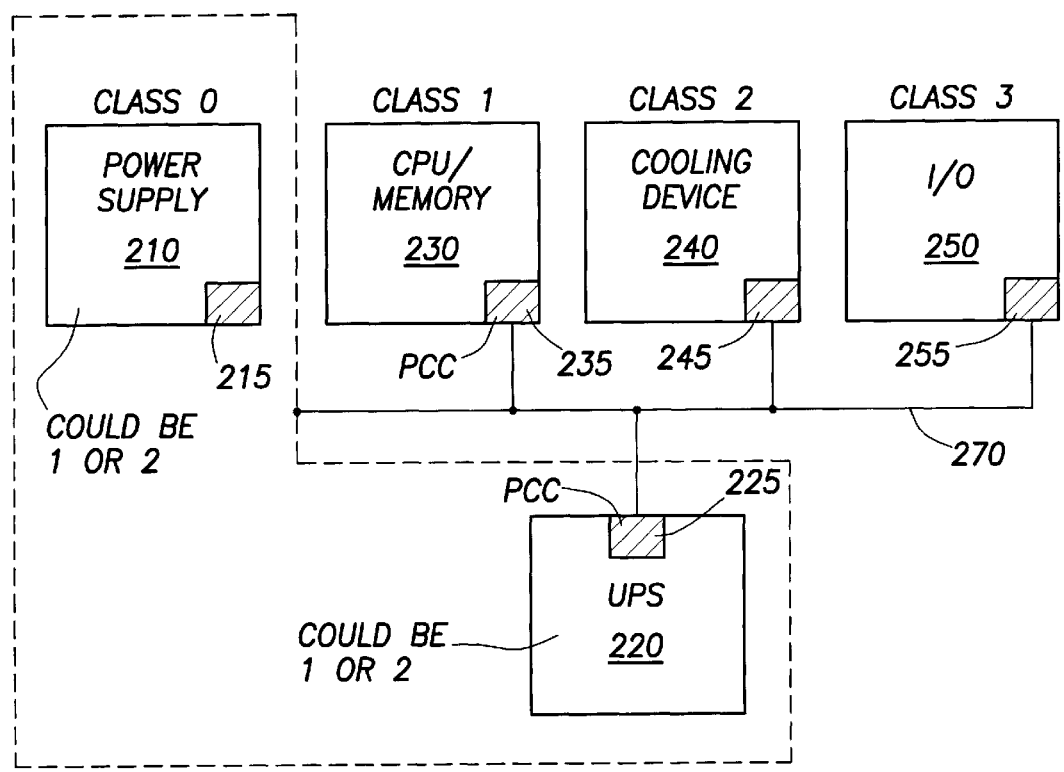
FIG. 2 shows a block diagram of an exemplary computer system according to a preferred embodiment, with system devices divided into different classes.

FIG. 2 shows a block diagram of an exemplary computer system according to a preferred embodiment, with system devices divided into different classes. In this diagram, each device shown incorporates a respective power communications controller (PCC), which communicates over power rail 270. In this example, power supply 210 includes PCC 215 and is designated Class 0. Uninterruptable Power Supply (UPS) 220 which includes PCC 225, may optionally be a unit distinct from the power supply 210, or they may be integrated together, as indicated by the broken box. In this example, Class 1 includes CPU/memory system 230 and PCC 235. Class 2 includes cooling device 240 and PCC 245. Class 3 includes I/O device 250 and PCC 255. All devices are connected, through their respective PCCs, to power rail 270.

Figure 3:
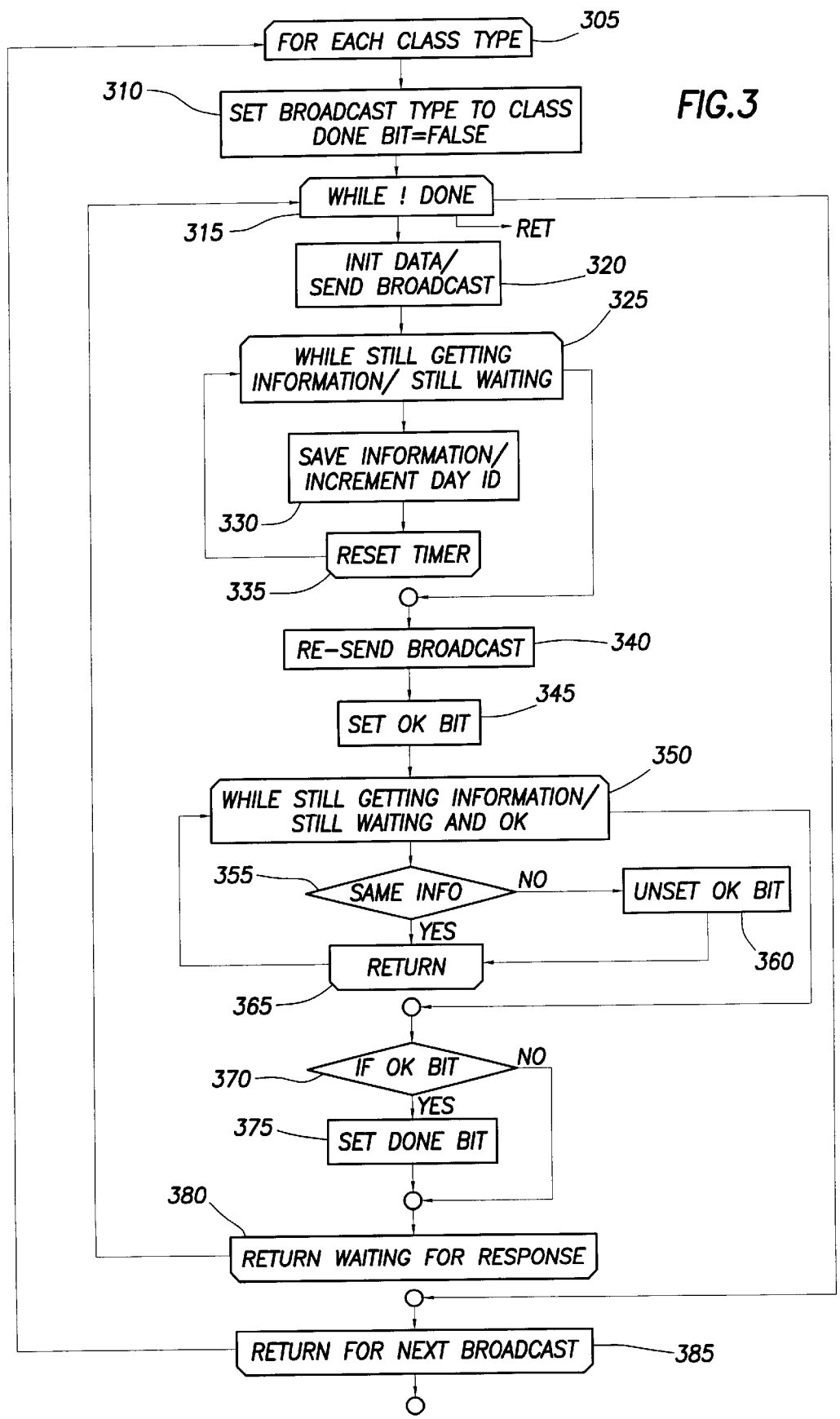
FIG. 3 shows a flow chart of a process according to a preferred embodiment.

FIG. 3 shows a flow chart of a class-based broadcast process according to a preferred embodiment. In this chart, when a command or request is sent to a certain class of device (step 305), the broadcast type is set to "class" and the "DONE" bit is cleared (step 310). Then, as long as the DONE bit remains clear (step 315), a repeated broadcast/verify routine is performed.

First, the broadcast is initialized and sending begins (step 320). Then, as long as the sending device continues to receive ACKs from devices that have received the broadcast (step 325), the sending device keeps waiting, and saves the list of responding devices as it receives the acknowledgments (step 330). As it receives each ACK, it resets a delay timer, and waits for the next one (step 335). If the timer expires without receiving another ACK, it assumes that it is done and leaves the initial broadcast loop.

Next, it resends the same broadcast (step 340) and sets an OK bit to a default 1 (step 345). It then waits for device responses, as above (step 350, looping at step 365). As it receives responses, as long as the responses are the same as those received earlier and saved in step 330 (step 355), it keeps looping. If it gets anything different, the OK bit is cleared (step 360) After all information is received, the process continues.

The status of the OK bit is then checked (step 370). If it is set, the DONE bit is set as well (step 375) if not, the DONE bit is cleared. The process then loops back (step 380) to step 315. If the DONE bit is set, the routine is finished (step 385) and is ready for the next broadcast (looping back to step 305). If the DONE bit is clear, the entire broadcast sequence is retried (looping back to step 315).

Figure 4A:
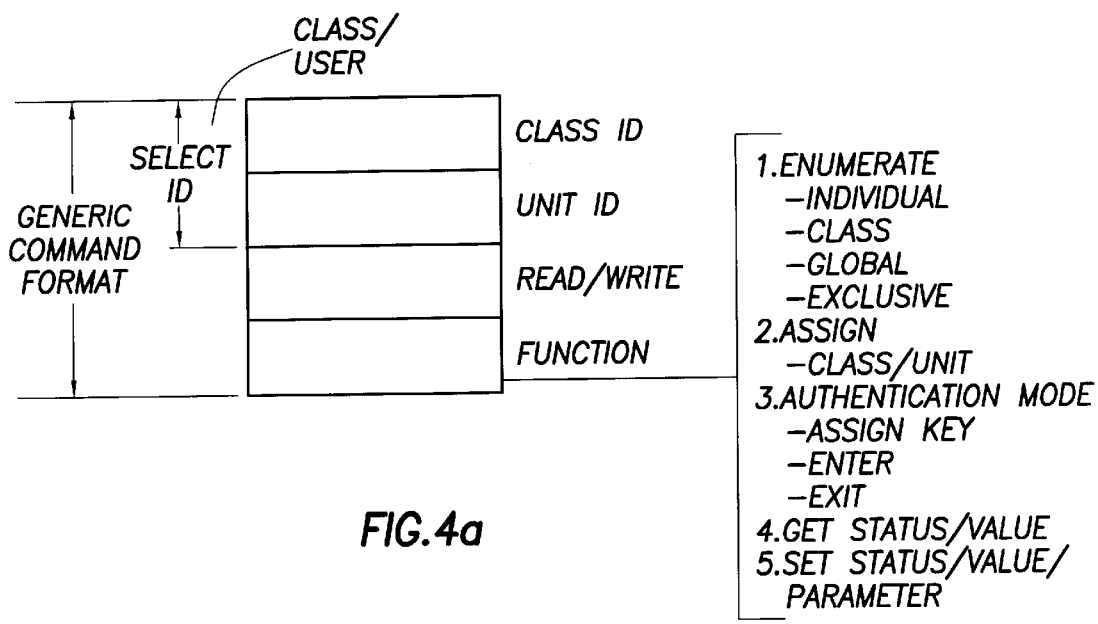
FIG. 4 shows the format of a data/instruction block according to a preferred embodiment.

FIG. 4 shows the format of two data/instruction blocks according to a preferred embodiment. FIG. 4*a* shows a generic command format. In this block, the select ID includes both the device class ID and the unit ID. Next in this block is a read/write bit, indicating the type of transmission. Finally, the function portion of the block indicates the function to be performed.

Typical functions of a preferred embodiment include enumeration, which could be specified for individual units or device classes, globally, or exclusively. An "assign" function would allow devices to be assigned specific class and unit IDS. An Enter/Exit/Assign authentication code function to change the authentication mode allows the device to be switched between authenticated and unauthenticated command, or to have the authentication key assigned or changed. A "Get Status/Value" function allows the device to be polled for its current status, e.g. the current speed of the fan or the current temperature of the system. Finally, a "Set Status/Value/Parameter" function allows the status of the device to be changed, e.g. changing the speed of fan or powering down a hard drive.

Figure 4B:
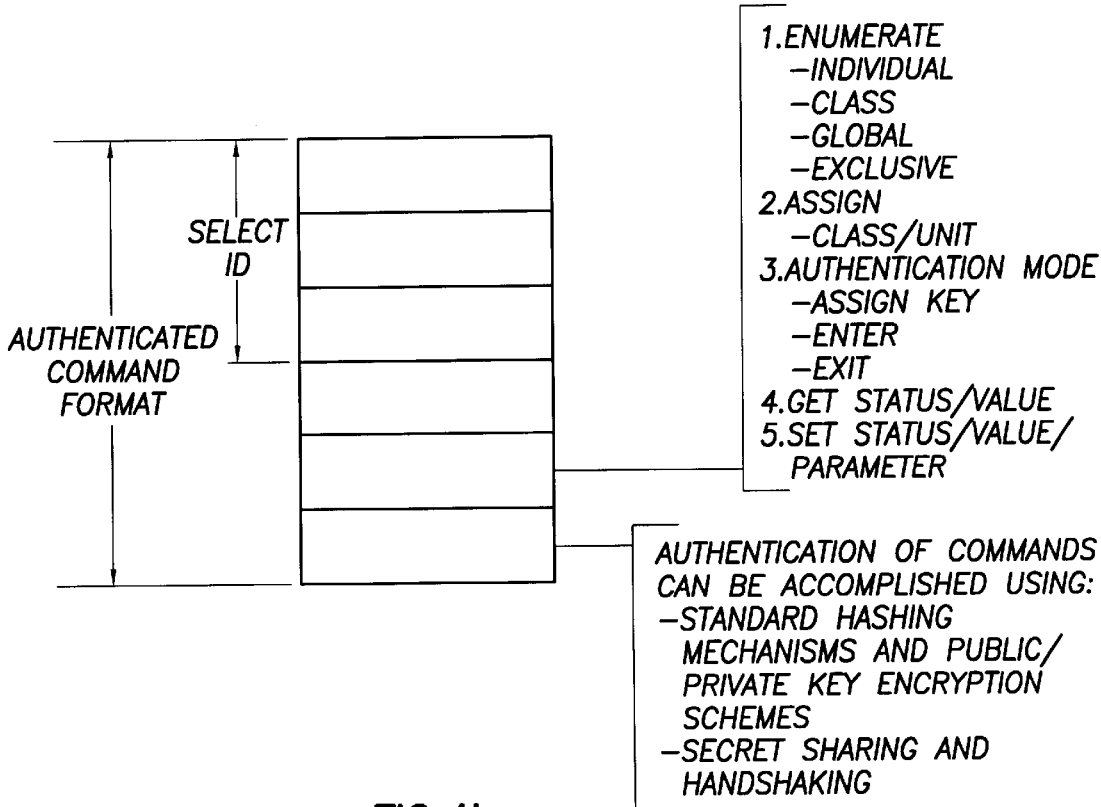

FIG. 4*b* shows an authenticated command format, which is the same as the generic command format but adds an authentication field. This field contains an authentication code or key, and can support standard hashing mechanisms, public/private key encryption schemes, and secret sharing and handshaking.

According to one disclosed embodiment, there is provided a computer system, comprising: a plurality of system devices, including at least one microprocessor which can perform data transfer over at least one data bus; and a power supply connected to provide power to an internal power rail common to said system devices; wherein multiple ones of said system devices communicate with each other over said power rail, independently of said bus.

According to another disclosed embodiment, there is provided a computer system, comprising: a input device, a microprocessor which is operatively connected to detect inputs from said input device, random-access memory which is connected to be read/write accessible by said microprocessor, and an output device operatively connected to receive outputs from said microprocessor; a plurality of system devices including a power supply connected to provide power to an internal power rail common to said system devices; an a cooling device connected to cool the interior of said system; wherein said system devices communicate with each other over said power rail; and wherein at least two of said system devices each have respective device identification codes and respond to a roll call request, made by any other system device, with that respective device identification code.

According to another disclosed embodiment, there is provided a computer system, comprising: a user input device, a microprocessor which is operatively connected to detect inputs from said input device, random-access memory which is connected to be read/write accessible by said microprocessor, and an output device operatively connected to receive outputs from said microprocessor; a plurality of system devices including a power supply connected to provide power to an internal power rail common to said system devices; and a cooling device connected to cool the interior of said system; wherein said system devices communicate with each other over said power rail; and wherein said system devices respond to and execute any specific command received over said power rail only once regardless of whether that specific command is repeated.

According to another disclosed embodiment, there is provided a system of hardware management in a computer system, comprising: computer system components connected to a power rail, including a microprocessor which is operatively connected to detect inputs from said input device, random-access memory which is connected to be read/write accessible by said microprocessor, and an output device operatively connected to receive outputs from said microprocessor, non-volatile random-access storage which is connected to be read/write accessible by said microprocessor and at least one cooling device; and a power supply connected to said power rail to provide power to said computer system components; wherein said computer system components communicate with each other and with said power supply over sad power rail.

According to another disclosed embodiment, there is provided a method of hardware management, comprising: powering a plurality of computer components via a common power rail; broadcasting a command over said power rail by at least one of said plurality of computer components; and executing said command by at least on of said plurality of computer components Modifications and Variations As will be recognized by those skilled in the art, the innovative concepts described in the present application can be modified and varied over a tremendous range of applications, and accordingly the scope of patented subject matter is not limited by any of the specific exemplary teachings given.

While the disclosed architecture is particularly advantageous for peer-to-peer communications between non-CPU components, it is also applicable to communications which are not peer-to-peer, and/or to components which may include CPU as well as non-CPU components.

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs. Any of these devices, if connected to the system power rail, may benefit from the disclosed techniques.

Further, while the preferred embodiments are drawn to systems which draw their power from the system power rail, it is alternatively possible to adapt these techniques to devices which are merely connected to, but not powered by, the system power rail. For example, an external media device such as a CD-ROM drive may be powered directly by a power mains connection, but may also be connected to the system power rail (possibly with DC isolation) to obtain the benefits of the disclosed system management techniques.

Additional general background, which helps to show the knowledge of those skilled in the art regarding the system context, and of variations and options for implementations, may be found in the following publications, all of which are hereby incorporated by reference. In particular, many details may be found in the books from MindShare, Inc., including Protected Mode Software Architecture, CardBus System Architecture, EISA System Architecture, ISA System Architecture, 80486 System Architecture, Pentium Processor System Architecture, PCMCIA System Architecture, Plug and Play System Architecture, PCI System Architecture, USB System Architecture, and Pentium Pro Processor System Architecture, all of which are hereby incorporated by reference, and in the Pentium Processor Family Developer's Manual 1997, the Multiprocessor Specification (1997), the Intel Architecture Optimizations Manual, the Intel Architecture Software Developer's Manual, the Peripheral Components 1996 databook, the Pentium Pro Processor BIOS Writer's Guide (version 2.0, 1996), and the Pentium Pro Family Developer's Manuals from Intel, all of which arc hereby incorporated by reference.

What is claimed is:

1. A computer system, comprising:
   a plurality of system devices, including at least one microprocessor which can perform data transfer over a data bus; and
   a power supply connected to provide power to an internal DC power rail common to said system devices;
      wherein multiple ones of said system devices communicate with each other over said power rail, independently of said data bus.

2. The system of claim 1, wherein one of said plurality of system devices generates command and control signals to communicate with others of said plurality of devices.

3. The system of claim 1, wherein said communications take place utilizing a modified CEBus standard.

4. The system of claim 1, wherein said communications are enabled by microcontrollers in respective ones of said system devices.

5. A computer system, comprising:
   a input device, a microprocessor which is operatively connected to detect inputs from said input device, random-access memory which is connected to be read/write accessible by said microprocessor, and an output device operatively converted to receive outputs from said microprocessor;
   a power supply connected to provide power to an internal DC power rail common to said system devices; and
   a cooling device connected to cool the interior of said system;
      wherein said system devices communicate with each other over said power rail; and
      wherein at least two of said system devices each send respective device identification codes whenever a roll call request is made by another system device over said power rail.

6. The system of claim 5, wherein one of said plurality of system devices generates command and control signals to communicate with others of said plurality of devices.

7. The system of claim 5, wherein said communications take place utilizing the CEBus standard.

8. The system of claim 5, wherein said communications take place utilizing a modified CEBus standard.

9. The system of claim 5, wherein said communications over said power rail includes authentication codes.

10. The system of claim 5, wherein said communications are enabled by microcontrollers in respective ones of said system devices.

11. A computer system, comprising:
    a user input device, a microprocessor which is operatively connected to detect inputs from said input device, random access memory which is connected to be read/write accessible by said microprocessor, and an output device operatively connected to receive outputs from said microprocessor;
    a plurality of system devices including
       a power supply connected to provide power to an internal power rail common to said system devices; and
       a cooling device connected to cool the interior of said system;
    wherein said system devices communicate with each other over said power rail; and
    wherein said system devices respond to and execute any specific command received over said power rail only once regardless of whether that specific command is repeated.

12. The system according to claim 11, wherein said commands include authentication codes.

13. The system of claim 11, wherein said communications are enabled by microcontrollers in respective ones of said system devices.

14. A system of hardware management in a computer system comprising:
    computer system components connected to a DC power rail, including a microprocessor which is operatively connected to detect inputs from said input device, random-access memory which is connected to be read/write accessible by said microprocessor, and an output device operatively connected to receive outputs from said microprocessor, non-volatile random-access storage which is connected to be read/write to accessible by said microprocessor and at least one cooling device; and
    a power supply connected to said power rail to provide power to said computer system components;
    wherein said computer system components communicate with each other and with said power supply over said power rail.

15. The system according to claim 14, wherein said computer system components includes an optical storage drive.

16. The system according to claim 14, wherein said computer system components includes communications ports.

17. The system according to claim 14, wherein said computer system components utilize authentication codes when communicating over said power rail.

18. The system of claim 14, wherein said communications are enabled by microcontrollers in respective ones of said system computer system components.

* * * * *